United States Patent
Nishii et al.

(10) Patent No.: US 8,167,760 B2
(45) Date of Patent: May 1, 2012

(54) TOROIDAL CONTINUOUSLY VARIABLE TRANSMISSION UNIT AND CONTINUOUSLY VARIABLE TRANSMISSION

(75) Inventors: Hiroki Nishii, Fujisawa (JP); Eiji Inoue, Fujisawa (JP); Norihisa Kobayashi, Fujisawa (JP); Toshiro Toyoda, Fujisawa (JP)

(73) Assignee: NSK Ltd., Tokyo (JP)

(*) Notice: Subject to any disclaimer, the term of this patent is extended or adjusted under 35 U.S.C. 154(b) by 556 days.

(21) Appl. No.: 12/307,048

(22) PCT Filed: Jun. 22, 2007

(86) PCT No.: PCT/JP2007/062600
§ 371 (c)(1),
(2), (4) Date: Dec. 30, 2008

(87) PCT Pub. No.: WO2008/001690
PCT Pub. Date: Jan. 3, 2008

(65) Prior Publication Data
US 2009/0318260 A1 Dec. 24, 2009

(30) Foreign Application Priority Data

Jun. 30, 2006 (JP) .................................. 2006-180921
Dec. 13, 2006 (JP) .................................. 2006-335771

(51) Int. Cl.
*F16H 37/02* (2006.01)
(52) U.S. Cl. ........................................................ 475/214
(58) Field of Classification Search .................. 475/207, 475/209, 214, 215, 216, 217
See application file for complete search history.

(56) References Cited

U.S. PATENT DOCUMENTS

| 2,157,238 | A | | 5/1939 | Hunt |
| 2,646,696 | A | * | 7/1953 | Kepes ............................ 475/194 |
| 3,494,224 | A | * | 2/1970 | Fellows et al. ................. 475/114 |
| 4,570,501 | A | * | 2/1986 | de Bris Perry .................. 476/10 |
| 5,194,052 | A | | 3/1993 | Ueda et al. |
| 5,842,945 | A | * | 12/1998 | Inoue ............................ 475/207 |
| 6,599,216 | B1 | * | 7/2003 | Wafzig et al. ................. 475/214 |
| 6,605,016 | B2 | * | 8/2003 | Miyata et al. ................. 475/216 |
| 6,949,045 | B2 | * | 9/2005 | Wafzig et al. ................. 475/216 |
| 7,326,147 | B2 | * | 2/2008 | Imanishi et al. ............... 477/50 |
| 2004/0157695 | A1 | * | 8/2004 | Ishikawa et al. .............. 475/207 |

FOREIGN PATENT DOCUMENTS

| DE | 10361332 B4 | 6/2006 |
| JP | 63-111356 A | 5/1988 |
| JP | 8-93816 A | 4/1996 |

(Continued)

OTHER PUBLICATIONS

German Office Action issued in Application No. 11 2007 001 592.6, dated Apr. 8, 2010.

*Primary Examiner* — Roger L Pang
*Assistant Examiner* — Michael Gonzalez
(74) *Attorney, Agent, or Firm* — Sughrue Mion, PLLC

(57) ABSTRACT

In this toroidal continuously variable transmission unit, a carrier 100 and a disc 2 is brought into direct friction contact with each other, and power transmission between the carrier 100 and the disc 2 is implemented by friction force. Because of this, the necessity of machining a gear or claw on the disc or carrier, which has conventionally be done, is obviated, whereby a manufacturing process can be shortened and manufacturing costs can largely be reduced.

4 Claims, 9 Drawing Sheets

FOREIGN PATENT DOCUMENTS

| | | |
|---|---|---|
| JP | 10-61744 A | 3/1998 |
| JP | 11-303961 A | 11/1999 |
| JP | 2002-139118 A | 5/2002 |
| JP | 2004-218769 A | 8/2004 |
| JP | 2004-53591 A | 11/2004 |
| JP | 2004-533591 A | 11/2004 |

\* cited by examiner

| CAM LEAD | μ2 | r0 | r2 | θ | k0 |
|---|---|---|---|---|---|
| 0.03541 | 0.25 | 0.04 | 0.023 | 62.5 | 0.625 |

| VARIATOR REDUCTION RATIO | φ | TRACTION COEFFICIENTS | f (x) |
|---|---|---|---|
| 2.28 | 29.5 | 0.046 | 0.0043 |
| 1.993 | 35.5 | 0.050 | 0.0041 |
| 1.726 | 41.5 | 0.053 | 0.0038 |
| 1.484 | 47.5 | 0.055 | 0.0035 |
| 1.269 | 53.5 | 0.055 | 0.0032 |
| 1.083 | 59.5 | 0.054 | 0.0028 |
| 0.923 | 65.5 | 0.053 | 0.0024 |
| 0.788 | 71.5 | 0.051 | 0.0019 |
| 0.674 | 77.5 | 0.049 | 0.0015 |
| 0.579 | 83.5 | 0.046 | 0.0010 |
| 0.502 | 89.5 | 0.044 | 0.0005 |
| 0.439 | 95.5 | 0.041 | 0.0000 |

TOROIDAL CONTINUOUSLY VARIABLE TRANSMISSION UNIT AND CONTINUOUSLY VARIABLE TRANSMISSION

TECHNICAL FIELD

The present invention relates to a toroidal continuously variable transmission unit which can be used as a transmission unit for automotive vehicles or various types of industrial machines and a continuously variable transmission which includes the same transmission unit.

BACKGROUND ART

A double cavity toroidal variously variable transmission unit for use in, for example, an automotive vehicle is configured as is shown in FIGS. 9 and 10. As is shown in FIG. 9, an input shaft 1 is supported rotatably inside a casing 50, and two input discs 2, 2 and two output discs 3, 3 are attached to an outer circumference of the input shaft 1. In addition, an output gear 4 is supported rotatably on an outer circumference of an intermediate portion of the input shaft 1. The output discs 3, 3 are spline connected to tubular flange portions 4a, 4a which are provided at a central portion of the output gear 4 (for example, refer to Patent Document No. 1).

The input shaft 1 is made to be driven to rotate by a drive shaft 22 via a loading cam type pressing device 12 which is provided between an input disc 2 shown as being situated on a left-hand side in the figure and a cam plate (a loading cam) 7. In addition, the output gear 4 is supported relative to a partition wall (an intermediate wall) 13 which is made up by connecting together two members via angular bearings 107 and is supported inside the casing 50 via the partition wall 13, whereby the output gear 4 can not only rotate about an axis of the input shaft 1 but also is prevented from being displaced in the direction of the axis O.

The output discs 3, 3 are supported by needle bearings 5, 5 which are interposed between the input shaft 1 and themselves so as to rotate about the axis O of the input shaft. In addition, the left-hand input disc 2 in the figure is supported on the input shaft 1 via a ball spline 6, and a right-hand input disc 2 is spline connected to the input shaft 1, whereby these input discs 2 are made to rotate together with the input shaft 1. In addition, power rollers 11 (refer to FIG. 10) are held rotatably between internal surfaces (toroidal surfaces; also referred to as traction surfaces) 2a, 2a of the input disks 2, 2 and internal surfaces (toroidal surfaces; also referred to as traction surfaces) 3a, 3a of the output discs 3, 3.

A stepped portion 2b is provided on an inner circumferential surface 2c of the input disc 2 which is depicted as being situated on the right-hand side of FIG. 9, and a stepped portion 1b formed on an outer circumferential surface 1a of the input shaft 1 is brought into striking contact with the stepped portion 2b, while a back side (a right-hand side as viewed in FIG. 9) of the input disc 2 is brought into striking contact with a loading nut 9 screwed on a threaded portion formed on the outer circumferential surface of the input shaft. By this configuration, the displacement of the input disc 2 in the direction of the axis O relative to the input shaft 1 is prevented substantially. In addition, a coned disc spring 8 is provided between the cam plate 7 and a flange portion 1d of the input shaft 1, and this coned disc spring 8 imparts a pressure to abutment portions between the toroidal surfaces 2a, 2a, 3a, 3a of the respective discs 2, 2, 3, 3 and circumferential surfaces 11a, 11a of the power rollers 11, 11.

As is shown in FIG. 10, which is a sectional view taken along the line A-A in FIG. 9, a pair of yokes 23A, 23B are supported inside the casing 50 and in positions lying sideways of the output discs 3, 3 so as to hold both the discs 3, 3 from both sides thereof. The pair of yokes 23A, 23B are formed by pressing or forging a metal such as steel into a rectangular shape. In addition, to support rotatably pivot shafts 14 provided at both end portions of trunnions 15, which will be described later, circular support holes 18 are provided in four corners of the yokes 23A, 23B, and circular locking holes 19 are formed in central portions in a width direction of the yokes 23A, 23B.

The pair of the yokes 23A, 23B are supported by support posts 64, 68 formed at portions on inner surfaces of the casing 50 which oppositely face each other so as to be displaced slightly. These posts 64, 68 are provided, respectively, in a first cavity 221 and a second cavity 222 which exist between the internal surface 2a of the input disc 2 and the internal surface 3a of the output disc 3 so as to face oppositely each other.

Consequently, the yokes 23A, 23B face oppositely at one end portions thereof an outer circumferential portion of the first cavity 221 and at the other end portions thereof an outer circumferential portion of the second cavity 222 in such a state that the yokes 23A, 23B are supported by the support posts 64, 68, respectively.

Since the first and second cavities 221, 222 have the same construction, hereinafter, only the first cavity 221 will be described.

As is shown in FIG. 10, in the inside of the casing 50, a pair of trunnions 15, 15 are provided in the first cavity 221 which each oscillate about a pair of pivot shafts (attitude shafts) 14, 14 which lie in positions which are twisted relative to the input shaft 1. In addition, in FIG. 10, the illustration of the input shaft 1 is omitted. The trunnions 15, 15 each have a pair of bent wall portions 20, 20 which are formed at both longitudinal (vertical in FIG. 10) end portions of a support plate portion 16 which constitutes a main body portion thereof so as to be bent towards an internal surface side of the support plate portion 16. A toroidal recessed pocket portion P for accommodating the power roller 11 is formed in each of the trunnions 15, 15 by these bent wall portions 20, 20. In addition, the pivot shafts 14, 14 are provided coaxially with each other on external surfaces of the respective bent wall portions 20, 20.

A circular hole 21 is formed in a central portion of the support plate portion 16, and a proximal end portion (a first shaft portion) 23a of a displacement shaft 23 is supported in this circular hole 21. In addition, the inclination angles of the displacement shafts 23 which are supported at central portions of the trunnions 15, 15 are made to be adjusted by oscillating the trunnions 15, 15 about their associated pivot shafts 14, 14. Additionally, each power roller 11 is supported rotatably on a circumference of a distal end portion (a second shaft portion) 23b of the displacement shaft 23 which projects from an internal surface of each of the trunnions 15, 15, and the power rollers 11, 11 are held between each of the input discs 2, 2 and each of the output discs 3, 3. Note that the proximal end portion 23a and the distal end portion 23b of each of the displacement shafts 23, 23 are eccentric with each other.

In addition, as has been described before, the pivot shafts 14, 14 of each of the trunnions 15, 15 are supported so as to oscillate freely and to be displaced axially (vertically in FIG. 10) relative to the pair of yokes 23A, 23B, and the horizontal movement of the trunnions 15, 15 is restricted by the respective yokes 23A, 23B. As has been described before, the circular four support holes 18 are formed in the four corners of each of the yokes 23A, 23B, and the pivot shafts 14 which are provided at both the end portions of the trunnion 15 are supported in the support holes 18, respectively, via radial needle bearings (attitude bearings) 30 so as to freely oscillate (freely tilt). In addition, as has been described before, the circular locking holes 19 are formed in the central portion in the width direction (horizontal in FIG. 10) of the yokes 23A, 23B, and inner circumferential surfaces of the locking holes 19 are made into a shape of an inner surface of a circular tube so that the support posts 64, 68 are fitted therein, respectively. Namely, the upper yoke 23A is supported in an oscillating fashion by the spherical post 64 which is supported on the casing 50 via a fixing member 52, and the lower yoke 23B is supported in an oscillating fashion by the spherical post 68 and an upper cylinder body 61 of a drive cylinder 31 which supports the spherical post 68.

The displacement shafts 23, 23 provided on the trunnions 15, 15 are provided in 180-degree opposite positions relative to the input shaft 1. In addition, the direction in which the distal end portions 23b of the displacement shafts 23, 23 are offset relative to the proximal end portions 23a is made to be the same (vertically opposite in FIG. 10) as the rotational direction of both the discs 2, 2, 3, 3. In addition, the offset direction is made to be substantially at right angles to the direction in which the input shaft 1 is provided. Consequently, the respective power rollers 11, 11 are supported so as to be slightly displaced in a longitudinal direction of the input shaft 1. As a result of this, even in the event that the power rollers 11, 11 tend to be displaced in the axial direction of the input shaft 1 due to elastic deformation or the like of respective constituent members based on a thrust load generated by the pressing device 12, the displacement of the power rollers 11, 11 is absorbed with no unreasonable force applied to the respective constituent members.

In addition, a thrust ball bearing 24, which is a thrust rolling bearing, and a thrust needle bearing 25 are provided between an external surface of the power roller 11 and an internal surface of the support plate portion 16 of the trunnion 15 sequentially in that order from the external surface of the power roller 11. Of these bearings, the thrust ball bearing 24 is such as to permit the rotation of each power roller 1 while bearing a load applied to the power roller 11 in a thrust direction. The thrust ball bearing 24 designed in that way is made up of a plurality of balls 26, 26, an annular cage 27 for holding these balls 26, 26 in a rolling fashion, and an annular outer ring 28. In addition, an inner ring raceway of the thrust ball bearing 24 is formed on the external surface (a large end surface) of the power roller 11, while an outer ring raceway is formed on an internal surface of the outer ring 28.

In addition, the thrust needle bearing 25 is held between the internal surface of the support plate portion 16 of the trunnion 15 and an external surface of the outer ring 28. The thrust needle bearing 25 designed in this way permits the oscillation of the power roller 11 and the outer ring 28 about the proximal end portion 23a of the displacement shaft 23 while bearing a thrust load applied to the outer ring 28 from the power roller 11.

Furthermore, drive rods (shaft portions extending from the pivot shaft 14) 29, 29 are provided at one end portions (lower end portions in FIG. 10) of the respective trunnions 15, 15, and drive pistons (hydraulic pistons) 33, 33 are fixedly provided on outer circumferential surfaces of intermediate portions of the respective drive rods 29, 29. In addition, these drive pistons 33, 33 are fluid tightly fitted in the drive cylinder 31 which is made up of the upper cylinder body 61 and a lower cylinder body 62. The drive pistons 33, 33 and the drive cylinder 31 make up a drive system 32 for displacing the respective trunnions 15, 15 in the axial direction of the pivot shafts 14, 14 of the trunnions 15, 15.

In the case of the toroidal continuously variable transmission which is configured as has been described above, the rotation of the drive shaft 22 is transmitted to the respective input discs 2, 2 and the input shaft 1 via the pressing device 12. Then, the rotation of the input discs 2, 2 is transmitted, respectively, to the output discs 3, 3 via the pair of power rollers 11, 11, and furthermore, the rotation of the output discs 3, 3 is taken out from the output gear 4.

When a rotational speed ratio between the input shaft 1 and the output gear 4 is changed, the pair of drive pistons 33, 33 are made to be displaced in opposite directions to each other. The pair of trunnions 15, 15 are displaced (offset) in opposite directions to each other in conjunction with the displacement of the respective pistons 33, 33. For example, the left-hand power roller 11 in FIG. 10 is displaced downwards, while the right-hand power roller 11 in the same figure is displaced upwards in the figure. As a result, directions of tangential forces are changed which act on the abutment portions between the circumferential surfaces 11a, 11a of the respective power rollers 11, 11 and internal surfaces 2a, 2a, 3a, 3a of the respective input discs 2, 2 and respective output discs 3, 3. Then, in conjunction with the changes in the tangential forces, the respective trunnions 15, 15 oscillate (tilt) about the pivot shafts 14, 14 which are rotatably supported on the yokes 23A, 23B in opposite directions to each other.

As a result of the oscillation of the trunnions 15, 15, abutment positions between the circumferential surfaces 11a, 11a of the respective power rollers 11, 11 and the respective internal surfaces 2a, 3a change, whereby the rotational speed ratio between the input shaft 1 and the output gear 4 changes. In addition, when a torque transmitted between the input shaft 1 and the output gear 4 changes, resulting in a change in elastic deformation amount of the respective constituent members, the respective power rollers 11, 11 and the outer rings 28, 28 which are attached to the power rollers 11, 11 slightly rotate about the proximal end portions 23a, 23a of the respective displacement shafts 23, 23. Since the thrust needle bearings 25, 25 are present, respectively, between external surfaces of the respective outer rings 28, 28 and internal surfaces of the support plate portions 16 which constitute the trunnions 15, 15, the rotation is implemented smoothly. Consequently, only a small magnitude of force is necessary to change the inclination angles of the respective displacement shafts 23, 23.

Incidentally, when power circulation or power distribution is implemented by combining a toroidal continuously variable transmission unit like the one described above with a planetary gear device, it possible to eliminate a clutch or realize high efficiency. FIG. 11 shows a continuously variable transmission in which a planetary gear device is combined with a toroidal continuously variable transmission unit. This continuously variable transmission is made up a combination of a toroidal continuously variable transmission unit 147 which has substantially the same construction as the construction shown in FIGS. 9 and 10 and first to third planetary gear transmission devices (hereinafter, referred to as a planetary gear device) 148, 149, 150 and has an input shaft 1 and an output shaft 151. In addition, a transmission shaft 152 is provided between the input shaft 1 and the output shaft 151 so as to be coaxial with these shafts 1, 151 and to rotate relative to the shafts 1, 151. In addition, a pressing device 12A is of a hydraulic type, and input- and output discs 2, 3 are supported relative to a hollow shaft 159 which the input shaft 1 penetrates. In addition, the input shaft 1 is made to receive a rotational force from a drive shaft 22 via the pressing device 12A.

In addition, in the combined construction like this, with a view to making the transmission small in size or particularly reducing an axial length of the transmission, a mechanism has been developed in which an input shaft 1 of a toroidal continuously variable transmission unit and a carrier 100 of a planetary gear device 148 are made integral, and an axial pressing force and torque which are necessary to enable the toroidal continuously variable transmission unit to implement traction drive are made to be transmitted to input discs 2 which are disposed outside via the carrier 100 of the planetary gear device 148.

In either of the cases, the transmission of power between the input disc 2 which is disposed outside the planetary gear device 148 and the carrier 100 thereof is implemented via a gear (for example, refer to Patent Document No. 2), or is implemented via a claw (refer to Patent Document No. 3).

Patent Document No. 1: Japanese Patent Unexamined Publication JP-A-11-303961

Patent Document No. 2: Japanese Patent Unexamined Publication JP-A-2004-533591

Patent Document No. 3: Japanese Patent Unexamined Publication JP-A-2004-218769

DISCLOSURE OF THE INVENTION

Problem that the Invention is to Solve

However, when the transmission of power between the input disc 2 and the carrier 100 is implemented via the gear or claw, the gear or claw needs to be machined on the input disc 2 or the carrier 100. Because of this, the number of manufacturing steps is increased (consequently, time necessary for manufacture is extended), and the production costs are also increased.

In addition, the problem in relation to power transmission between the constituent members is caused not only in the combined construction of the toroidal continuously variable transmission unit and the planetary gear device but also in the toroidal continuously variable transmission unit alone. For example, as has been described before, the output discs 3 and the output gear 4 (the flange portions 4a, 4a) are connected together though spline connection, and because of this, the number of production steps is increased by provision of a spline machining step, this also increasing the production costs. To machine splines at a low cost, although broaching is suitable, the broaching approach has a restriction that only through splines can be machined, and this constitutes a limiting matter when attempting to adopt a design which places importance to costs.

In addition, as is seen from the construction that has been described above, although in the conventional approach, the splines for power transmission are disposed on the inner circumferential side of the output disc 3, since the contact point between the output disc 3 and the power roller 11 shifts radially inwards (to the inner circumferential surface side) to generate stress concentration when increasing the speed, there is caused a problem that the thickness of the inner circumferential side of the output disc 3 cannot be made thin, and this interrupts the reduction in weight of the disc.

Additionally, in the case of the transmission unit, due to a restriction with respect to its capacity, it is general practice to dispose a clutch upstream, in terms of power flow, of a variator portion built in the casing 50 and made up of the input shaft 1, the discs 2, 3 and the power rollers 11. However, in the case of such a construction being adopted, since there is no slipping element downstream of the variator portion, in the event that the output disc 3 is broken for some reason, broken pieces of the output disc 3 are allowed to bite into a rotary portion, and in a vehicle, in the worst case, there is caused a concern that a wheel is locked. When a wheel is locked while the vehicle is running at high speeds, there is a fear that a critical accident may happen, and hence, the elimination of a cause for such an accident has to be assured. Because of this, in the conventional approaches, a thin shaft is disposed purposefully downstream of the variator portion so as to avoid the risk when the trouble occurs. On the contrary, however, the portion where the thin shaft is so disposed has worked to restrict the reliability in durability.

The invention has been made in view of the situations described above, and an object thereof is to provide a toroidal continuously variable transmission unit and a continuously variable transmission which can enable a power transmission between rotary members by a low-cost construction without being accompanied by restrictions in design and deterioration in durability and which is superior in safety.

Means for Solving the Problem

The object is attained by the following configurations.

(1) A toroidal continuously variable transmission unit including:

an input shaft into which a rotational torque is inputted;

an input disc and an output disc which are supported on the input shaft concentrically and rotatably so that internal circumferential surfaces thereof are made to face oppositely each other;

power rollers provided between the input disc and the output disc and adapted to transmit a rotational force of the input disc to the output disc at a predetermined speed ratio; and a power transmission member for implementing a power transmission between one of the input disc and the output disc and itself, wherein the power transmission between the power transmission member and the one of the discs is implemented by friction force.

(2) The toroidal continuously variable transmission unit as set forth in (1), wherein the power transmission member and the one of the discs are brought into direct friction contact with each other.

(3) The toroidal continuously variable transmission unit as set forth in (1), wherein a friction material is interposed between the power transmission member and the one of the discs.

(4) The toroidal continuously variable transmission unit as set forth in (3), wherein the friction material is provided so as to be secured to the power transmission member.

(5) The toroidal continuously variable transmission unit as set forth in (1), wherein the input shaft is integrated with a carrier of a planetary gear device and the carrier makes up the power transmission member, whereby an axial pressure and torque which are necessary to enable the toroidal continuously variable transmission unit to implement a traction drive are made to be transmitted from the input shaft to the input disc via the carrier.

(6) The toroidal continuously variable transmission unit as set forth in (1), further including:

an output gear for receiving power from the output disc, wherein the output gear makes up the power transmission member.

(7) A continuously variable transmission having a combination of a planetary gear device and a toroidal continuously variable transmission unit for transmitting force by a traction force via an oil film between discs and power rollers, power being transmitted between a carrier of the planetary gear device and the disc, wherein the transmission of power between the carrier and the disc is implemented by a friction force.

(8) The continuously variable transmission as set forth in (7), wherein the carrier and the disc are brought into direct friction contact with each other.

(9) The continuously variable transmission as set forth in (7), wherein a friction material is interposed between the carrier and the disc.

Advantage of the Invention

According to the invention, since the transmission of power between the power transmission member and the disc is implemented by the friction force, the necessity of machining a gear or claw on the disc or the power transmission member, which has conventionally been done, is obviated (such an interposed member as the gear or the claw is made unnecessary). Because of this, the manufacturing process can be shortened, and the production costs can largely be reduced. A large advantage can be provided in particular when the power transmission member is brought into direct contact with the friction material. In addition, when the friction material is interposed between the power transmission member and the disc, a friction coefficient can be secured in an ensured fashion, which is useful. As this occurs, the friction material is preferably provided so as to be secured to the power transmission member. This is because in the event that the friction material is provided on the disc side, there is a fear that there exists an opportunity of the disc being imparted indentations. In addition, since power is transmitted by virtue of friction, even though the variator is locked due to some trouble being caused, for example, a wheel lock can be avoided due to the friction contact portion slipping. In addition, since the necessity of disposing a spline on the inner circumferential portion of the disc is obviated, the problem of stress concentration and restriction on design can be eliminated, thereby making it possible to realize a reduction not only in weight of the variator portion but also in production costs.

DESCRIPTION OF REFERENCE NUMERALS

1 input shaft;
2 input disc;
3 output disc;
4 output gear (power transmission member);
11 power roller;
100 carrier (power transmission member);
148 planetary gear device;
200, 300, 305, 310 friction material

BEST MODE FOR CARRYING OUT THE INVENTION

Figure 9:
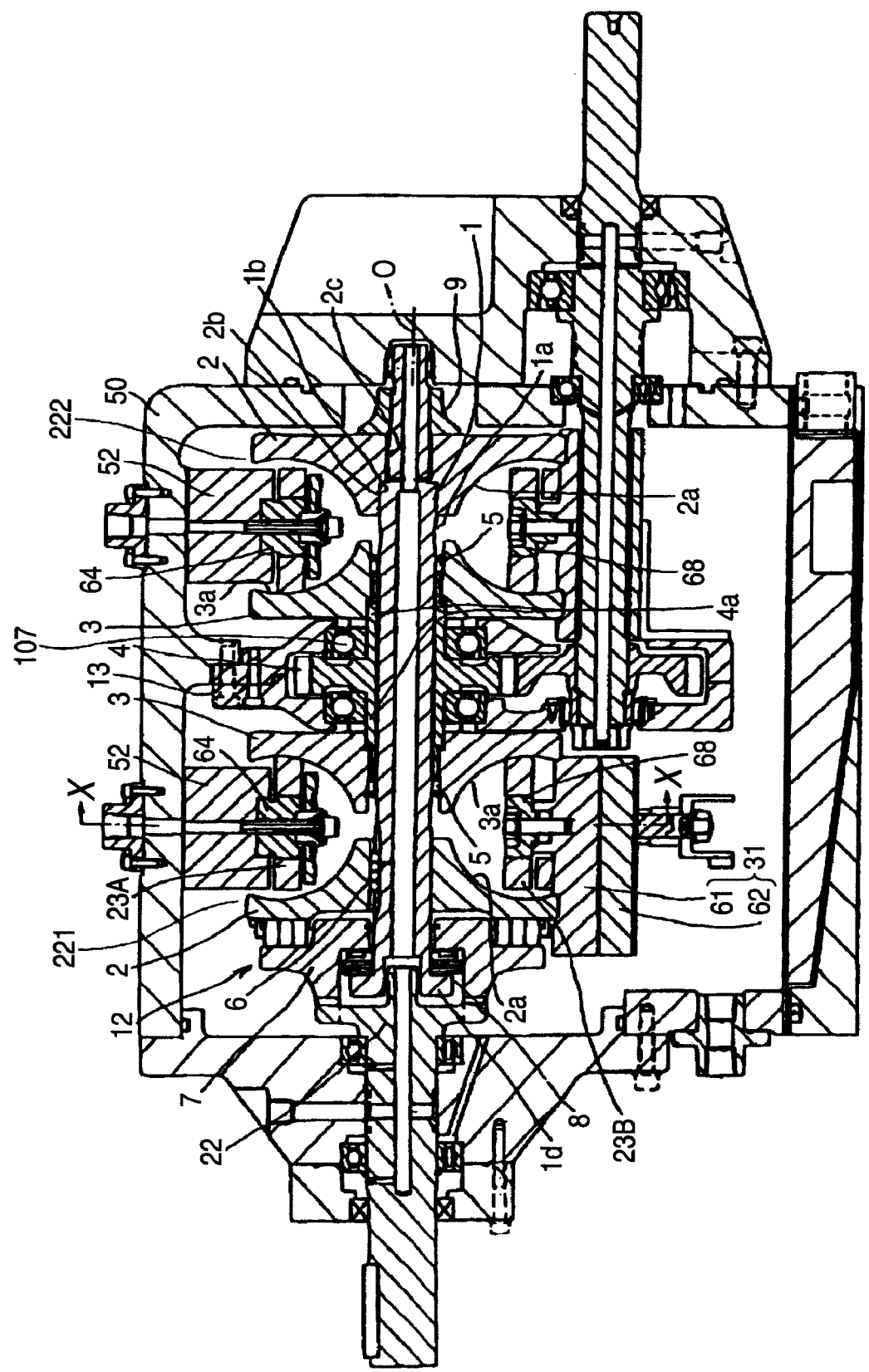
FIG. 9 is a sectional view showing an example of a specific construction a conventionally known half-toroidal continuously variable transmission unit.
Figure 10:
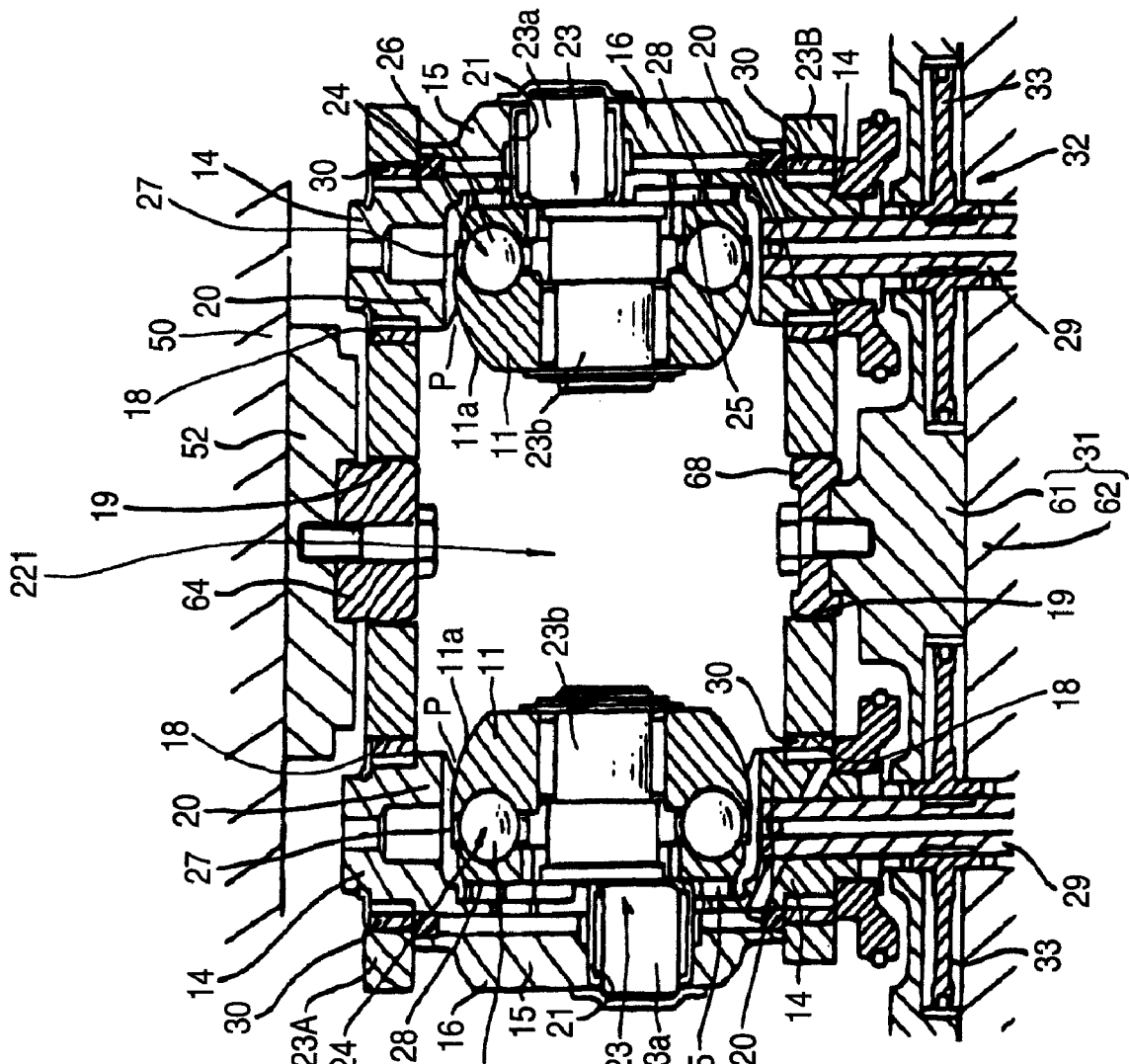
FIG. 10 is a sectional view taken along the line X-X in FIG. 9.
Figure 11:
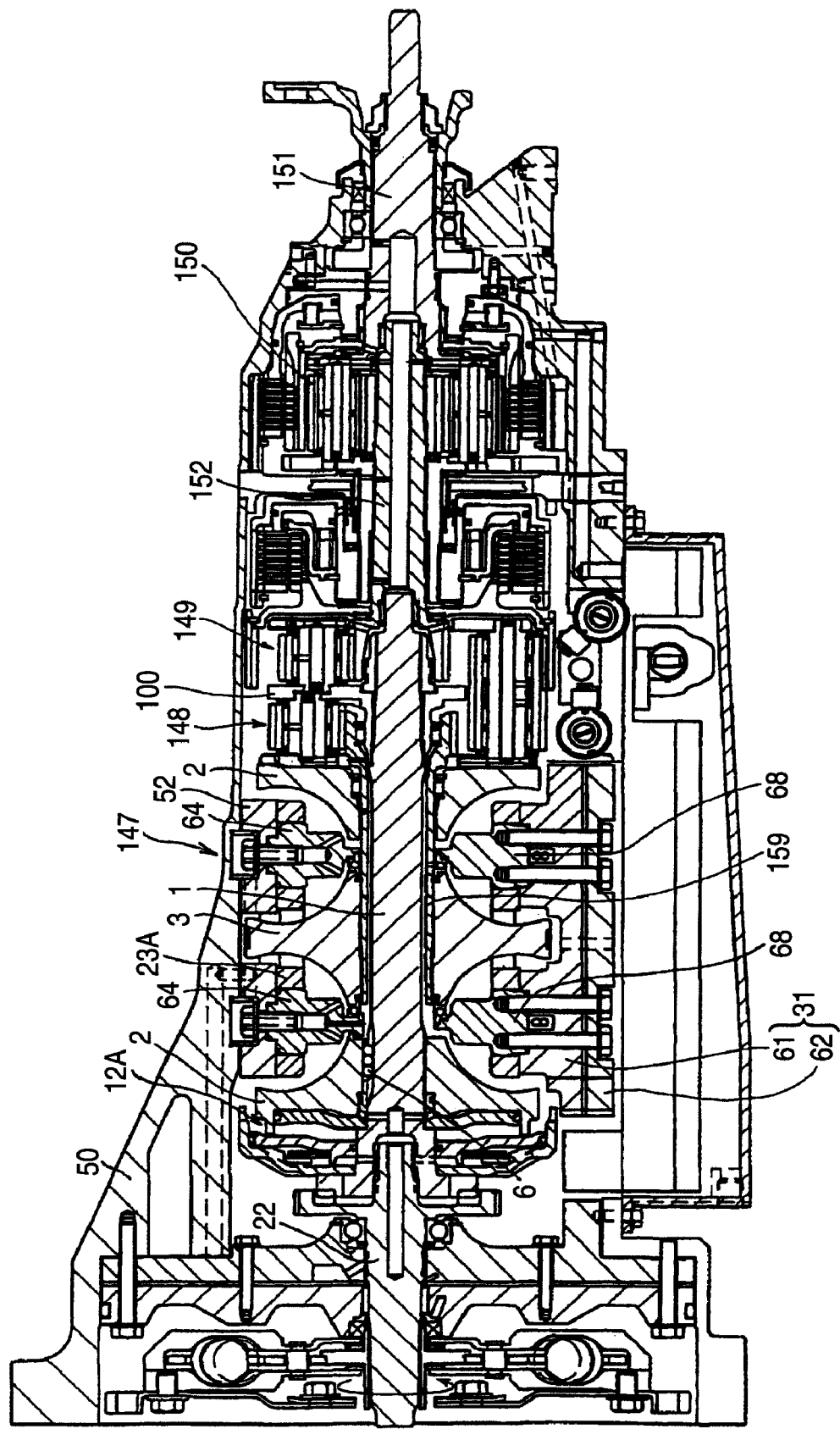
FIG. 11 is a sectional view of a main part of a continuously variable transmission in which a toroidal continuously variable transmission unit is combined with a planetary gear device.

Hereinafter, referring to the drawings, embodiments of the invention will be described. Note that the invention is characterized by a power transmission construction between a carrier of a planetary gear device and a disc of a toroidal continuously variable transmission unit, and since the other configurations and functions thereof are similar to the configurations and functions of the conventional configurations that have been described above, in the following description, only characteristic portions of the invention will be described, and the other portions of the invention will be described only briefly by giving like reference numerals to those given in FIGS. 9 to 11.

Figure 1:
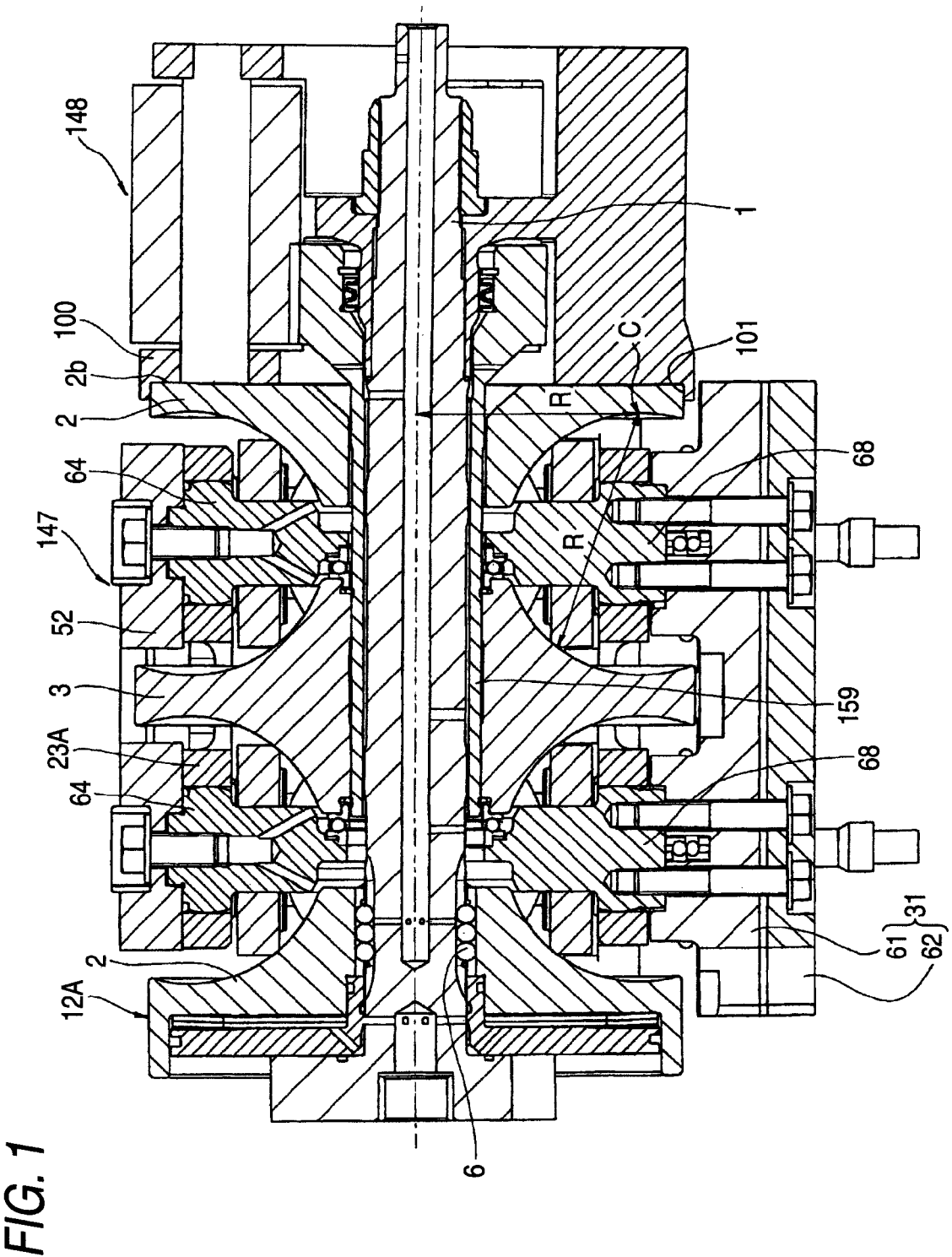
FIG. 1 is a sectional view of a main part of a continuously variable transmission according to a first embodiment of the invention.

FIG. 1 shows a continuously variable transmission according to a first embodiment of the invention. As is shown in the figure, in this embodiment, an input shaft 1 and a carrier (a power transmission member) 100 of a planetary gear device 148 are integrated. An axial pressure and torque which are necessary to allow a toroidal continuously variable transmission unit to implement a traction drive are made to be inputted from the input shaft 1 into an input disc 2 disposed outside the planetary gear device 148 via the carrier 100 of the planetary gear device 148, and the transmission of power between the carrier 100 of the planetary gear device 148 and the disc 2 of a toroidal continuously variable transmission unit 147, which are disposed in a back-to-back fashion is made to be implemented by friction force. Specifically, in the case of this embodiment, the carrier 100 and a back side 2b of the disc 2 are brought into direct friction contact with each other, and the contact portion is set to at least a portion whose radius is larger than a portion C having a largest contact radius R where a power roller 11 contacts the disc 2. In addition, centering of the disc 2 and the carrier 100 is also implemented at such a radially outside portion.

In addition, a disk-carrier transmission torque is given by the following expression.

(Transmission torque)=(friction coefficient between disk and carrier)×(axial pressure)×(contact radius between disk and carrier)

Consequently, when the friction coefficient is larger than the traction coefficient, in the event that a contact radius from a rotational center to a position where the disc contacts the carrier is large, there is generated no slippage between the disc and the carrier.

In this way, in this embodiment, since the carrier 100 and the disc 2 contact each other directly and the transmission of power between the carrier 100 and the disc 2 is implemented by friction force, the necessity of machining a gear or claw on the disc or the carrier, which has conventionally been carried out, is obviated. Namely, interposed members such as the gear and the claw are made unnecessary. Because of this, the manufacturing process can be shortened, and the manufacturing costs can largely be reduced.

Figure 2:
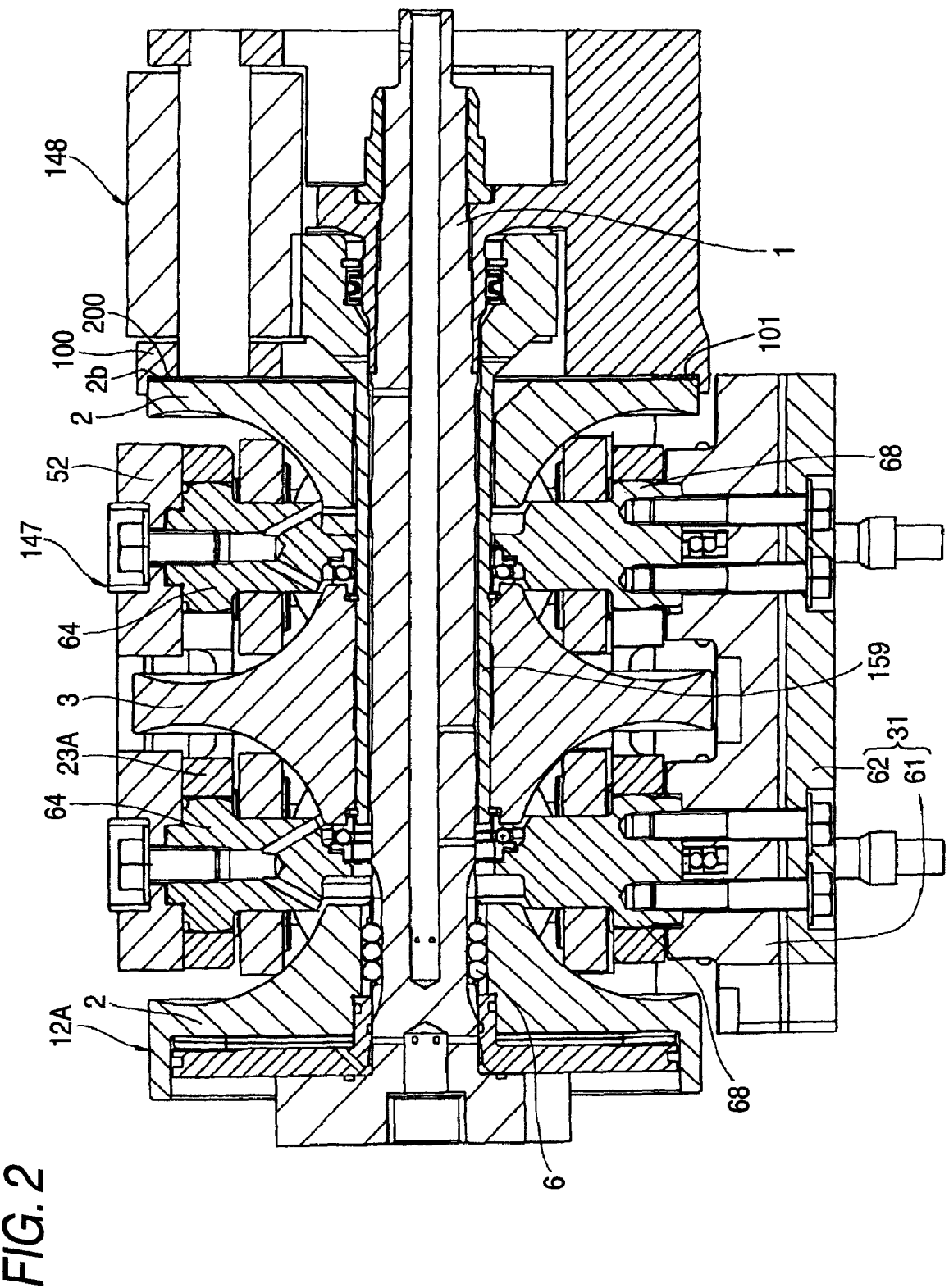
FIG. 2 is a sectional view of a main part of a continuously variable transmission according to a second embodiment of the invention.

FIG. 2 shows a continuously variable transmission according to a second embodiment of the invention. As is shown in FIG. 2, a friction material 200 is interposed between a back side 2b of a disc 2 and a carrier 100. In this case, the friction material 200 has a higher friction coefficient than a traction coefficient and is provided so as to be secured (affixed) to the carrier 100 side.

In this way, also in the case of this embodiment, as with the first embodiment, since the transmission of power between the carrier 100 and the disc 2 is implemented by friction force, the necessity of machining a gear or claw on the disc or the carrier, which has conventionally been carried out, is obviated, whereby the manufacturing process can be shortened, and the manufacturing costs can largely be reduced. In addition, since the friction material 200 is interposed between the carrier 100 and the disc 2, the friction coefficient can be secured in an ensured fashion. In particular, in this embodiment, since the friction material 200 is provided so as to be secured to the carrier 100 and is not provided so as to be secured to the disc 2 side, the opportunity of the disc 2 being imparted indentations is prevented from being increased, which is useful.

Figure 3:
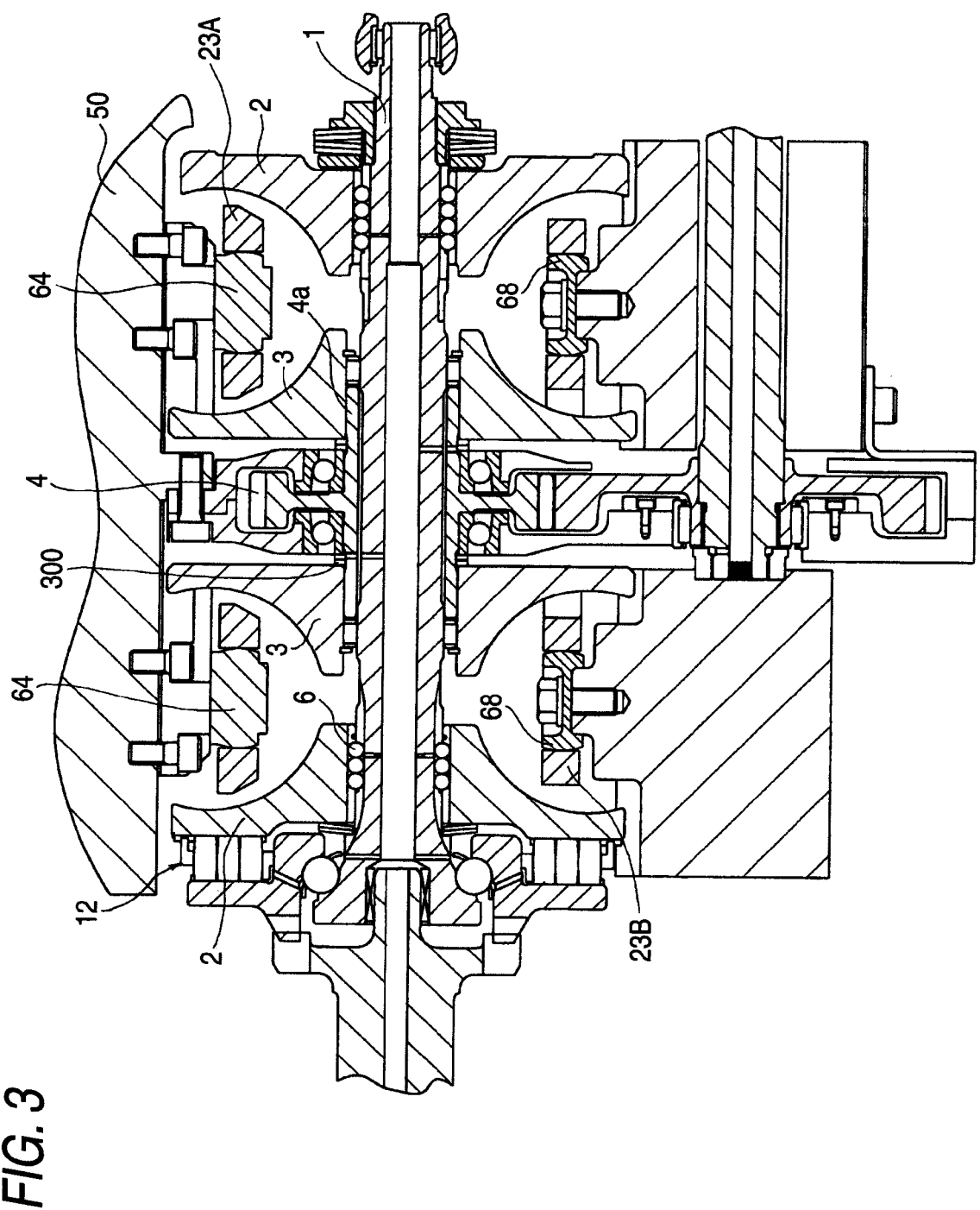
FIG. 3 is a sectional view of a main part of a toroidal continuously variable transmission unit according to a third embodiment of the invention.

FIG. 3 shows a toroidal continuously variable transmission unit according to a third embodiment of the invention. As is shown in FIG. 3, output discs 3, 3 are not spline connected to tubular flange portions 4a, 4a provided at a central portion of an output gear 4 as a power transmission member but are brought into friction contact therewith. Namely, the power transmission between the output gear 4 and the output disc 3 is made to be implemented by friction force. In this case, through holes and retainer ring grooves for the flange portions 4a, 4a are provided on an inner circumferential portion of the output disc 3. In addition, in this construction, since a back-up radius is small, a plurality of friction plates (friction materials) 300 are required. Herebelow, the reason therefor will simply be described.

Figures 4, 5, 6:
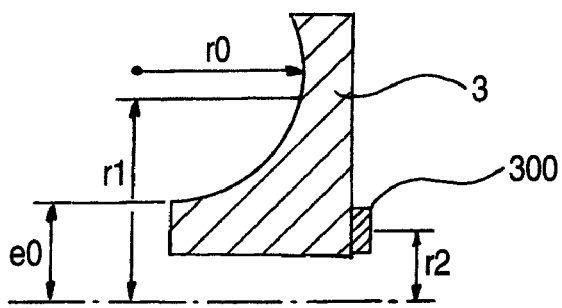
FIG. 4 shows specifications of a variator portion of the third embodiment.
FIG. 5 shows attitude angles φ, traction coefficients μ1 and f(x) for variator reduction ratios in the variator portion of the third embodiment.
FIG. 6 is an explanatory diagram explaining r0, r1 and r2.

FIG. 4 shows specifications of a variator portion of this embodiment. Here, $\mu2$ denotes a friction coefficient between the output gear 4 (a back side backup element) and the output disc 3 and r0 denotes a radius of curvature of the output disc 3. In addition, as is also shown in FIG. 6, r1 denotes a traction contact radius and r2 denotes a backup mean radius. In addition, $\theta$ denotes half cone angle. Additionally, FIG. 5 shows attitude angles $\phi$ for variator reduction rations, traction coefficients $\mu1$ and f(x), which will be described later.

Here, assuming that contact surface pressure at traction contact portion is Fc and the number of power rollers 11 is n, an axial force Fod of the output disc 3 is expressed as $$Fod = n \cdot Fc \cdot \sin(2\theta - \phi)$$

A friction torque T2 acting between the backup element and the output disc 3 becomes $$T2 = \mu2 \cdot Fod \cdot r2 \quad \text{(Expression 1)}$$

On the other hand, a torque T1 given to the output disc 3 by the traction force is as below $$T1 = n \cdot \mu1 \cdot Fc \cdot r1 \quad \text{(Expression 2)}$$

Consequently, a condition for generating no slippage between the output disc 3 and the backup element becomes $$T2 - T1 > 0 \quad \text{(Expression 3)}$$

Here, when (Expression 3) is substituted by (Expression 1) and (Expression 2), the following results.

$$\mu2 \cdot Fod \cdot r2 - n \cdot \mu1 \cdot Fc \cdot r1 = n \cdot Fc\{\mu2 \cdot r2 \cdot \sin(2\theta - \phi) - \mu1 \cdot r0(1 + k0 - \cos\phi)\}$$
$$= n \cdot Fc \cdot f(x) > 0$$

Here, k0 denotes cavity aspect ratio, and it is expressed as below using imaginary minimum turning radius of the disk and cavity radius r0 of the disc as k0=e0/r0

As is seen from what has been described heretofore, in the event that the friction coefficient between the output disc 3 and the backup element becomes 0.25 or larger, practically, there occurs no slippage. With a single friction plate 300, it is difficult to obtain $\mu > 0.25$, but by increasing the number of friction plates 300, since $\mu$ per friction plate can be reduced, the problem of slippage can be solved.

Since the output disc 3 is pushed only by the plurality of power rollers 11, the amount of deformation differs depending upon rotational phases, and therefore, a minute slippage continues between the output disc 3 and the output gear 4 (the backside backup element) during rotation, facilitating the generation of fretting. However, in the event that the friction plate 300 is interposed in the way done in this embodiment, the generation of fretting can be prevented.

As has been described heretofore, according to this embodiment, too, since the power transmission between the output gear 4 and the output disc 3 is implemented by friction force, the necessity of machining splines is obviated, and consequently, the problem of stress concentration and restrictions in design can be eliminated, thereby making it possible to realize a reduction not only in weight of the variator but also in manufacturing costs. In addition, in the event that power is transmitted through friction in the way described above, even though the variator portion is locked when some trouble is caused, the friction contact portion slips and hence, for example, a wheel lock can be avoided.

Figure 7:
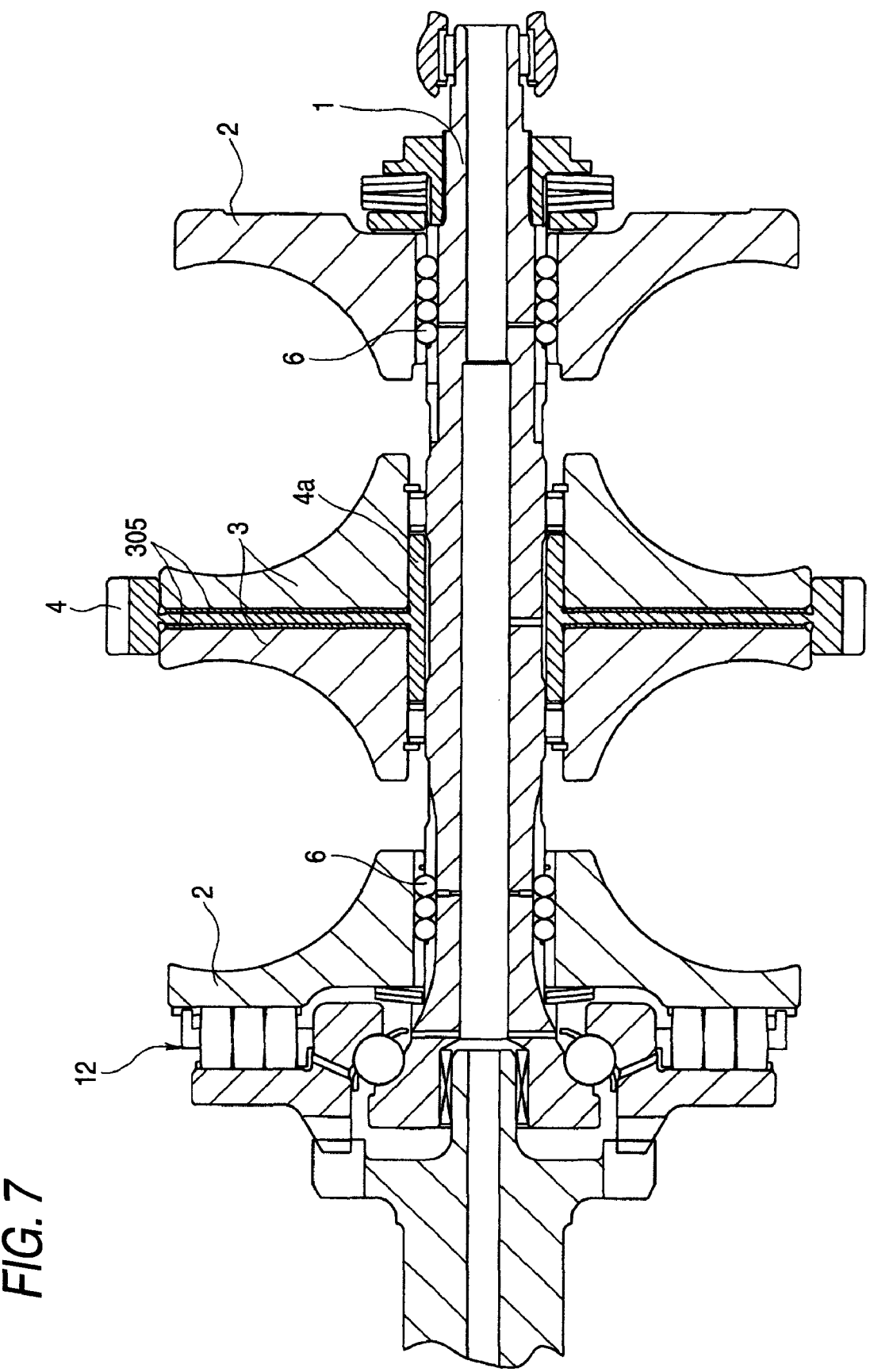
FIG. 7 is a sectional view of a main part of a toroidal continuously variable transmission unit according to a fourth embodiment of the invention.

FIG. 7 shows a toroidal continuously variable transmission unit according to a fourth embodiment of the invention. As is shown in FIG. 7, a construction is realized in which an output gear 3 is integrally friction connected while being held between a pair of output discs 3. A construction like this is simple and a reduction in cost can be realized. In addition, in a construction like this, since the backup radius is large, only a small friction coefficient $\mu$ is necessary. Because of this, although back sides of the output discs 3 may be brought into direct contact (for example, metal contact) with the output gear 4, as is shown in the figure, friction plates 305 may be interposed between the back sides of the output discs 3 and the output gear 4.

Figure 8:
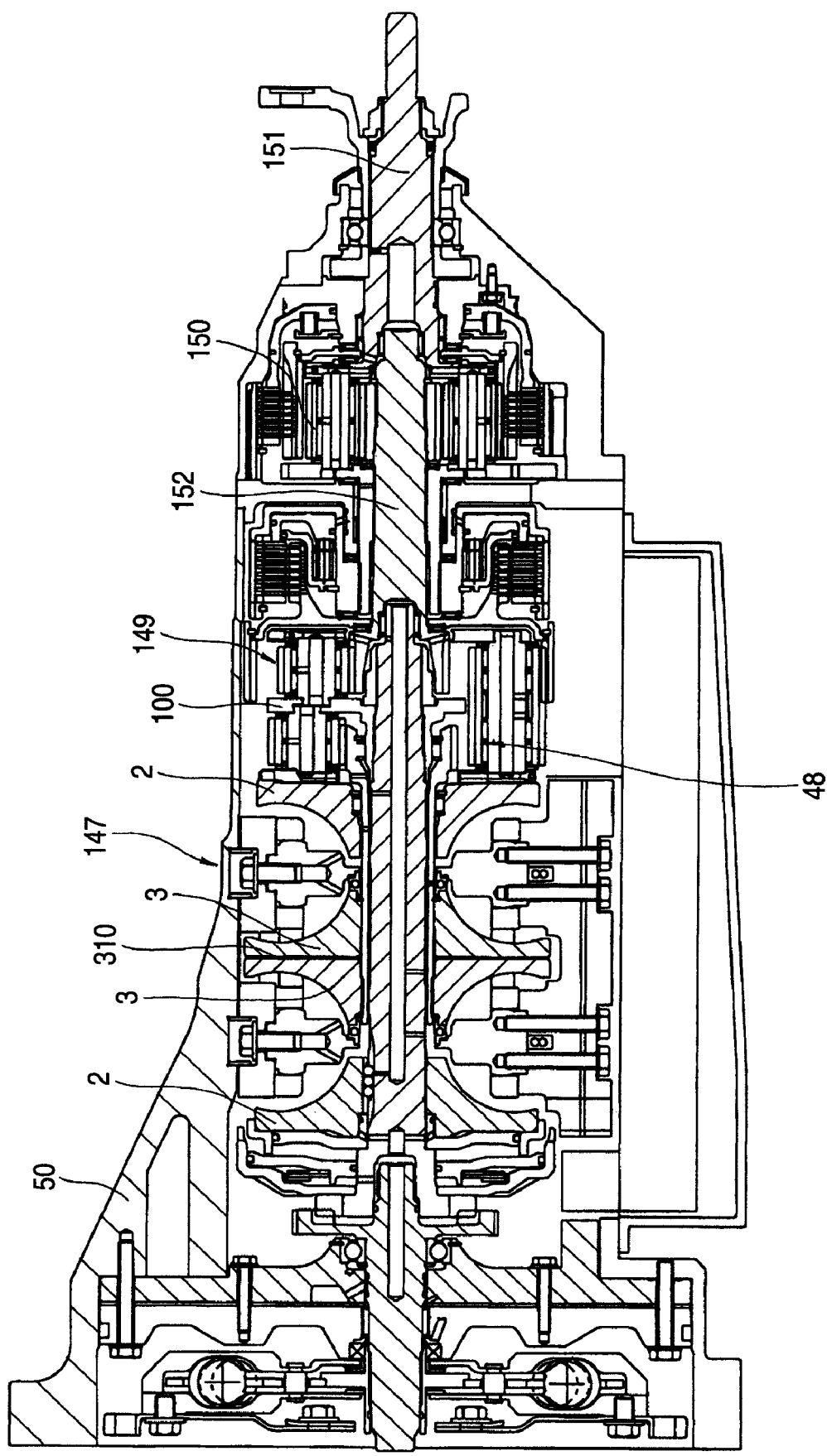
FIG. 8 is a sectional view showing a main part of a continuously variable transmission according to a further configuration.

FIG. 8 shows a further configuration. An example shown in FIG. 8 provides, as with the first and second embodiments, a continuously variable transmission which is made up of a combination of a toroidal continuously variable transmission unit and a planetary gear device, and specifically, a toroidal continuously variable transmission unit 147 and first to third planetary gear transmission devices (planetary gear device) 148, 149, 150 are combined together. In addition, a transmission shaft 152 is provided between the input shaft 1 and the output shaft 151 so as to be coaxial with these shafts 1, 151 and to rotate relative to the shafts 1, 151. This configuration is characterized in that a torque on a right-hand output disc 3 is transmitted to a left-hand output disc via a friction plate 310, so as to take out power from a spline connected portion formed on an inner circumferential portion of the left-hand output disc. Although there is provided no advantage with respect to torque fuse and stress relaxation, a reduction in cost can be attained in an effective fashion.

The present patent application is based on Japanese Patent Application (No. 2006-180921) filed on Jun. 30, 2006 and Japanese Patent Application (No. 2006-335771) filed on Dec. 13, 2006, and the contents thereof are incorporated herein by reference to their entireties.

INDUSTRIAL APPLICABILITY

In addition to various half-toroidal continuously variable transmission units of single cavity and double-cavity types, the invention can also be applied to trunnion-less full-toroidal continuously variable transmission units, as well as continuously variable transmissions which utilize these toroidal continuously variable transmission units.

The invention claimed is:

1. A toroidal continuously variable transmission unit comprising:
    an input shaft into which a rotational torque is inputted;
    an input disc and an output disc which are supported on the input shaft concentrically and rotatably so that internal circumferential surfaces thereof are made to face oppositely each other;
    power rollers provided between the input disc and the output disc and adapted to transmit a rotational force of the input disc to the output disc at a predetermined speed ratio; and
    a power transmission member for implementing a power transmission between one of the input disc and the output disc, and itself,
    wherein an axial pressure, that is necessary to enable the toroidal continuously variable transmission unit to implement a traction drive, is used for the power transmission between the power transmission member and the one of the discs,
    wherein the power transmission between the power transmission member and the one of the discs is implemented by friction force such that there is no relative movement therebetween, and
    wherein the power transmission member and the one of the discs are brought into direct friction contact with each other.

2. The toroidal continuously variable transmission unit as set forth in claim 1, wherein
    the input shaft is integrated with a carrier of a planetary gear device and the carrier makes up the power transmission member.

3. The toroidal continuously variable transmission unit as set forth in claim 1, further comprising:
    an output gear for receiving power from the output disc,
    wherein the output gear makes up the power transmission member.

4. A continuously variable transmission having a combination of a planetary gear device and a toroidal continuously variable transmission unit for transmitting force by a traction force via an oil film between discs and power rollers, power being transmitted between a carrier of the planetary gear device and one of the discs,
    wherein an axial pressure, that is necessary to enable the toroidal continuously variable transmission unit to implement a traction drive, is used for the power transmission between the carrier and the one of the discs,
    wherein the transmission of power between the carrier and the one of the discs is implemented by a friction force such that there is no relative movement therebetween, and
    wherein the carrier and the one of discs are brought into direct friction contact with each other.

* * * * *